April 21, 1936. E. G. RAGATZ 2,038,314
ABSORPTION SYSTEM
Filed July 3, 1933
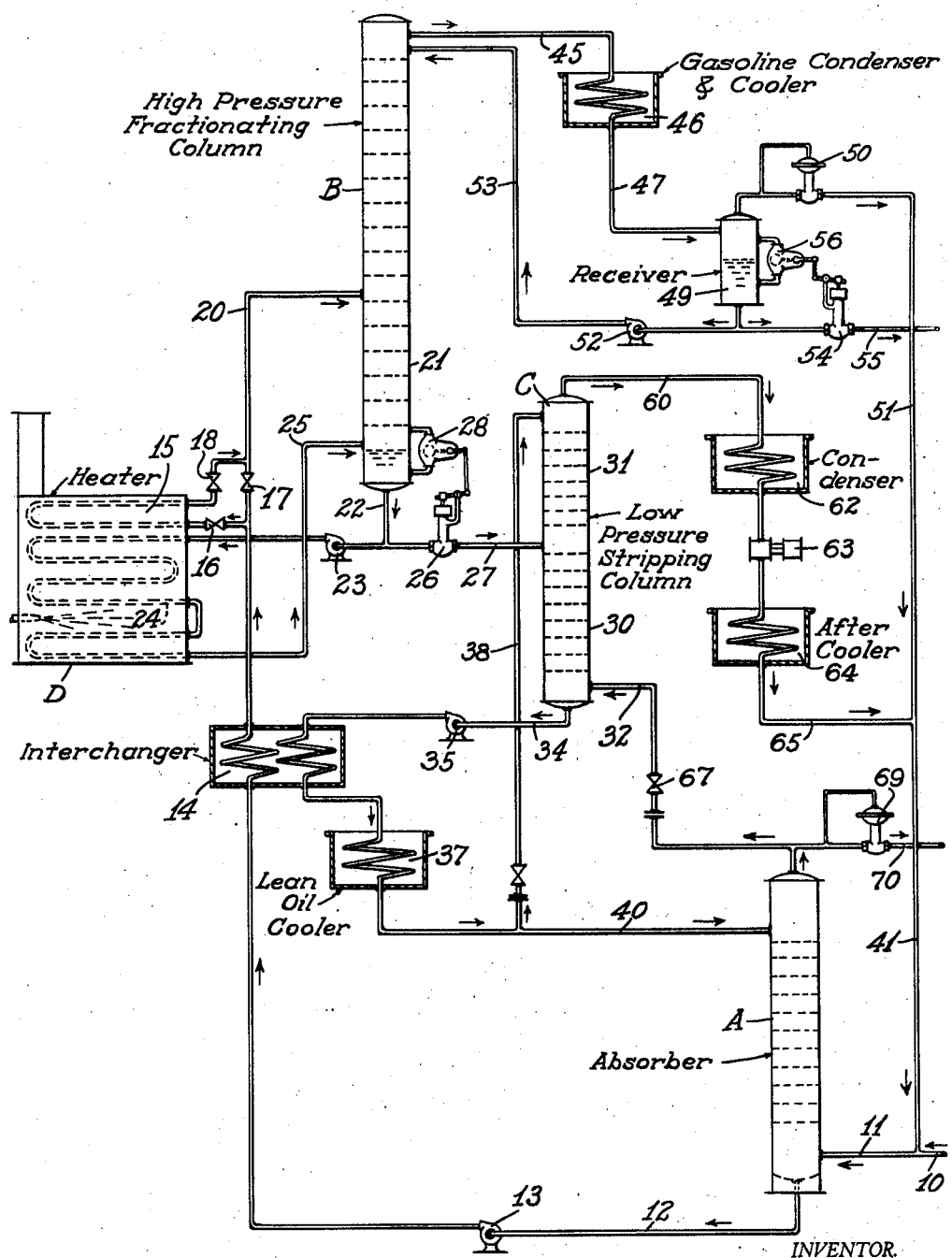
INVENTOR.
Edward G. Ragatz
BY Philip Subkow
ATTORNEY.

Patented Apr. 21, 1936

2,038,314

UNITED STATES PATENT OFFICE 2,038,314

ABSORPTION SYSTEM

Edward G. Ragatz, Los Angeles, Calif., assignor to Union Oil Company of California, Los Angeles, Calif., a corporation of California Application July 3, 1933, Serial No. 678,885

5 Claims. (Cl. 196—8)

This invention relates to a process and apparatus for the recovery of volatile substances from gases and more particularly to the extraction of liquids, such as natural gasoline, from natural gas by absorption, with recovery of the liquid by subsequent distillation of the absorbent.

It has been found that dry gas can be used for stripping in a stripping column displacing the use of steam therefor. In the preferred embodiment of this invention the said stripping gas issuing from the stripping column following stripping operations is compressed and cooled and the condensate and uncondensed gases returned to the absorption column for recycling through the system. This forms in effect a closed circulatory system between the stripping column and the absorption column around which a quantity of gas is circulated. In this manner effective stripping of the absorption oil is accomplished without the use of steam. The fractionating column feed is heated directly by means of a tubular heater, and thus, in view of the above described stripping operations, all necessity for steam supply equipment is eliminated and the extent of condensing equipment materially reduced. The efficiency of the system is further increased by operating the distillation in two stages, the fractionating column at high pressure and the stripping column at low pressure. By operating the fractionating column at high pressure the gasoline condenser service is more effective, due to resultant higher condensation temperatures and the quantity of desirable gas fractions recirculated through the system by way of the condenser vent gases is also materially reduced. Moreover, at higher pressures the capacity of the fractionating column of given size is increased.

In the conventional absorption system, steam stripping of the absorption oil still bottoms is employed to remove the remaining light volatile absorbed constituents. This necessitates boiler installations which are costly as compared to direct heating by means of a fired tubular heater. Also, in the conventional absorption system where steam is employed for distillation and stripping, a condensing and cooling system is required which is of large capacity relative to that required where steam is not used and heating is direct.

An object of this invention is to provide for distilling or stripping oils of their light constituents by means of gas which has previously passed through an absorber and which is returned along with the resulting overhead vapors from the distilling or stripping process to the said absorber. Another object of this invention is to increase the thermal and mechanical efficiency of an absorption system by stripping partially denuded absorption oil at low pressure, with dry gas, excluding all use of steam for such purposes. Another object of this invention is to eliminate steam stripping operations in connection with an absorption system by utilizing circulated gas for such stripping operations said circulated gas flowing successively through the stripping apparatus and the absorber.

In general these objects are attained according to the invention by two stage distillation, and the cycling of dry gas for all stripping operations.

The invention is embodied in an apparatus comprising an absorber, a low pressure stripping column, means for supplying dry gas from the absorber to the stripping column for stripping purposes therein and means to cool and compress gases from the stripping column and return the gas, vapors and/or condensate into the gas stream to the before mentioned absorber. The embodiment of the invention also provides for supplying hot partially denuded absorption oil from a fractionating column to a stripping column at reduced pressure and contacting said hot absorption oil with dry gas to remove the remnants of absorbed volatile fractions. Thus a circulation of dry gas from the absorber through the stripping column and back again to the absorber accomplishes the desired stripping operation without the use of steam, and since the effective heating of the absorption oil for the fractionating column is accomplished by direct heating in a tubular heater all need for steam and its accompanying equipment is eliminated.

The invention broadly stated comprises a method and apparatus for distilling oils by contact with circulated gas said gas being circulated from said contact with oil to an absorber and return in a complete cycle. The invention comprises more specifically a method and apparatus for the recovery of volatile substances from gases, such as gasoline, from natural gas by absorption in which a stripping operation of a partially denuded absorption oil is accomplished by continuously circulating a quantity of dry gas from the absorber through the stripping column and return. The invention also resides in a method and apparatus for the recovery of volatile substances from gases, such as gasoline, from natural gas comprising an absorption stage and a two stage distillation of absorbent, the second stage of which is a stripping operation in which the stripping is accomplished by contacting the hot absorbent oil at reduced pressure with dry gas from the absorber.

Other objects and advantages of this invention will be evident hereafter.

The accompanying drawing illustrates one embodiment of this invention.

The apparatus illustrated comprises the following main parts: An absorption tower A, a fractionating column B, a stripping column C and a fired tubular heater D.

The absorption tower A is of the conventional type in which the rich gas entering the bottom at 11 and the lean absorption oil introduced into the top through line 40 pass in countercurrent contact with one another. Bubble plates are provided throughout the length of the tower as indicated, for increasing the intimacy of contact of the oil and gas. The fat absorption oil containing absorbed constituents is withdrawn from the bottom of the tower through outlet line 12 and the dry gas is withdrawn from the top thereof through lines 67 and 70.

The fractionating column B is also of the conventional type containing bubble plates throughout the length thereof as indicated. It is provided with an absorption oil feed inlet 20 intermediate the top and bottom thereof thus forming in effect an upper fractionating portion and a lower stripping section. Provision is made for accumulation of the stripped bottoms in the bottom of the tower. Additional heat over and above that supplied through the feed may be imparted to the tower by circulating a portion of the accumulated bottoms by means of a pump 23 through a section 24, of the fired tubular heater D. Fractionated vapors withdrawn through the vapor line 45 at the top of the fractionating column B contain the desirable gasoline fractions recovered from the natural gas and they are cooled in cooler 46 and the condensable portions shipped to storage or otherwise disposed of through line 55. A portion of this condensate is returned to the top of the tower for reflux by pump 52 through line 53. The uncondensed portion of the fractionated vapors are returned through lines 51 and 11 and recycled through the absorption system.

The stripping column C comprises an upper fractionating section 31 and a lower stripping section provided throughout with bubble plates in a manner similar to the fractionating column B. The increment of bottoms from fractionating column B which are partially denuded of the absorbed natural gasoline fractions, constitutes the feed for said stripping column C. These said bottoms are flashed at reduced pressure through valve 26 and line 27 into the stripping column at a point intermediate the said fractionating section and stripping section thereof.

Provision is made for introducing dry gas from the absorption tower into the bottom of the said stripping section through inlet 32 and contacting the unvaporized portion of descending absorption oil therein countercurrently. The stripped vapors together with the gas and vaporized absorption oil are fractionated in the upper fractionating section of the stripping column C and provision is made for withdrawing these vapors through line 60, cooling them in cooler or condenser 62, compressing them in compressor 63, again cooling them in after cooler 64 and returning the resultant condensate and uncondensed gases together to the absorption system through lines 65, 51 and 11 for recirculation. Compressor 63 is of a type adapted to handle both liquids and vapors.

The fired tubular heater D is provided with two sections of tubes, one section 15 for heating the fat absorption oil feed to the fractionating column B and the other section 24 for heating and reboiling the bottoms in the bottom of fractionating column B, as described above. Circulation of bottoms through heater 24 is forced by pump 23.

Valves 16, 17 and 18 serve to regulate the amount of fat absorption oil by-passed through the heater coil 15 to control the still feed temperature.

Float control 28, by operating on valve 26 to open it when the level rises and to close it when the level falls, serves to control and maintain a constant liquid level in the bottom of fractionating column B. Liquid level control 56 operates in a similar manner upon valve 54 to regulate the liquid level in receiver 49.

The fractionating column B and stripping column C constitute the two stage distillation system. The fractionating column B is operated at high pressure and the stripping column C at a low pressure relative thereto. Bottoms withdrawn from column B are flashed at reduced pressure through valve 26 into the stripping column C followed by the stripping operations as described above.

The flow of absorption oil and gas through the system is briefly as follows: The rich wet gas laden with natural gasoline enters the absorption system by way of line 10, 11 and is withdrawn from the system through pressure regulating valve 69 and line 70 as dry gas after having the natural gas extracted therefrom. The recovered natural gasoline is withdrawn separately from the absorption system through line 55.

From the absorption tower A after contacting rich gas, the fat oil containing absorbed gasoline fractions is heated and introduced into the fractionating column B at high pressure where most of the absorbed fractions are extracted. From the bottom of column B the said distilled absorption oil is withdrawn and introduced at reduced pressure into a stripping column C where it is stripped of the remainder of the light fractions in countercurrent contact with dry gas. From the stripping column C the stripped, lean absorption oil is withdrawn and returned to the top of the absorption tower A to again contact rich gas and to repeat the cycle. The gas after contacting the absorption oil in the absorber is withdrawn and the dry gas disposed of through line 70. A quantity of the dry gas from the absorber A is introduced into the stripping column for the stripping purposes mentioned above and after being withdrawn from the stripping column the gas and vapors are returned to the absorber. Thus a continuous circulation of gas from the absorber to the stripping column and return is maintained.

The operation is as follows:

Rich gas laden with natural gasoline enters the absorption system through lines 10 and 11 and passes upward countercurrent to descending lean absorption oil in absorption tower A. The gasoline contained in the natural gas goes into solution in the lean absorption oil in the absorption tower and is withdrawn as fat oil laden with the said gasoline fractions in solution. The said withdrawn fat oil is forced by means of pump 13 through interchanger 14 where it is partially heated in indirect heat exchange with hot absorption oil, then through heating coil 15 in the fired tubular heater D where it receives final heating, and from there it is introduced, hot, through line 20 to an intermediate point of the fractionating column B. Valves 16, 17 and 18 may be adjusted to proportion the amount of fat absorption oil passing through the heater 15 and by-passing through 17 in order to regulate the temperature of the oil. The thus heated oil introduced into column B passes downward through the stripping section 21 and the unvaporized portion thereof accumulates in the bottom as shown. Additional heat is supplied to the bottoms and to the tower by circulating the said bottoms through heating coil 24 in the fired oil heater D by means of pump 23.

The increment of the bottoms in tower B not recirculated through the heater is withdrawn through line 27 and introduced hot into an intermediate point in stripping column C. Stripping column C comprises a lower stripping section 30 and an upper fractionating section 31. The said partially denuded absorption oil introduced hot through line 27 into the intermediate section of stripping column C partially vaporizes as it flows downward through the said stripping section 30 in countercurrent contact with rising dry gas, and the remnants of natural gasoline fractions in solution in the said oil are there removed. The said removed natural gasoline fractions together with the absorption oil vapors and the stripping gas pass upward through the fractionating section 31 in countercurrent relation to descending reflux supplied through line 38 and is withdrawn from the top through line 60 into cooler 62. The cooled gases from cooler 62 are compressed, again cooled in after cooler 64 and the resulting condensate and uncondensed gases are returned through lines 65 and 41 to the rich gas supply line 11 to the absorption tower. In some cases it may be desirable to return the vapors from the stripping column to the absorber without cooling sufficiently to form a condensate in which case little or no cooling medium will be supplied to the coolers 62 and 64. The lean, absorption oil stripped of its remnants of dissolved natural gasoline is withdrawn from the bottom of stripping column C through line 34 and a major portion thereof is returned to the top of absorption tower A through line 40 by pump 35 after flowing through heat interchanger 14 and lean oil cooler 37. A portion of this cool, lean absorption oil is recycled through line 38 to the top of stripping column C for reflux. The cool, lean absorption oil returned to the top of the absorption tower again passes downward therethrough in countercurrent contact with rich natural gas and repeats the cycle described above.

The resulting vapors from the stripping section 21 of column B are fractionated in the upper portion thereof in countercurrent contact with descending reflux, and the fractionated vapors are withdawn through line 45 and cooled by cooler 46. The condensate and uncondensed gases flow from cooler 46 through line 47 into receiver 49 where separation takes place. The fixed gases are vented from receiver 49 through pressure relief valve 50 and returned through line 51, 41 to the gas supply lines 10, 11 to the system, and the condensate is withdrawn from the bottom of the receiver and a portion returned by means of pump 52 through line 53 for reflux to tower B.

The balance of the withdrawn condensate is shipped to storage or otherwise disposed of through line 55. This commodity the said withdrawn condensate, constitutes the major portion of the unstabilized gasoline product recovered from the natural gas.

The stripping column may be operated without a fractionating section included therewith in which case the upper fractionating trays will be omitted.

Typical operating conditions for this absorption system are as follows:

Rich absorption oil enters the fractionating column B from the heater through feed line 20 at 350° F. while the recirculated bottoms from the heater D enters the column bottom through line 25 at about 475° F. The pressure in the column under these conditions is 60 pounds per square inch gauge. The temperature in the bottom of stripping column C will be about 365° F. while the pressure there is maintained at about atmospheric. Pressures in the absorption tower A may range from 30 to 300 pounds per square inch depending upon the service to which the system is applied. Absorption oil before entering the absorber A is cooled by interchanger 14 and cooler 37 to a temperature of about 78° F.

It is to be understood that the foregoing is merely illustrative of one apparatus and method of operation and that the invention is not limited thereby but includes any method and apparatus within the scope of the claims.

I claim:

1. A process for recovery of liquefiable hydrocarbon fractions from hydrocabon gases which comprises passing gases containing the liquefiable hydrocarbon fractions in contact with absorption oil in an absorption tower to absorb hydrocarbon fractions contained in said gases, subjecting said absorption oil containing absorbed liquefiable hydrocarbon fractions to fractional distillation under high pressure in a fractionating column to distill a portion of the absorbed constituents, withdrawing the undistilled absorption oil from the said fractionating column and subjecting said absorption oil to a further distillation under a lower pressure in a second fractionating column to distill remaining absorbed constituents from said absorption oil, said further distillation being accomplished in the presence of dry gas from said absorption tower but in the absence of any constituents being recovered in the high pressure fractionating column and returning denuded absorption oil and vaporized fractions from said second fractionating column to said absorption tower.

2. A process for recovering natural gasoline from natural gas which comprises passing natural gas containing natural gasoline in contact with absorption oil in an absorption tower to absorb natural gasoline contained in said natural gas, subjecting said absorption oil containing absorbed natural gasoline to fractional distillation under high pressure in a fractionating column to distill a portion of the absorbed constituents, withdrawing the undistilled absorption oil from said fractionating column and subjecting said absorption oil to further distillation under a lower pressure in a second fractionating column to distill remaining absorbed constituents from said absorption oil, said further distillation being accomplished in the presence of dry gas from said absorption tower but in the absence of any constituents being recovered in the high pressure fractionating column and returning denuded absorption oil and vaporized fractions from said second fractionating column to said absorption tower.

3. A process for recovering natural gasoline from natural gas which comprises passing natural gas containing natural gasoline in contact with absorption oil in an absorption tower to absorb natural gasoline contained in said natural gas, subjecting said absorption oil containing absorbed natural gasoline to fractional distillation under high pressure in a fractionating column to distill a portion of the absorbed constituents, condensing said distilled constituents and returning a portion of the condensed constituents to said high pressure fractionating column, withdrawing the undistilled absorption oil from said fractionating column and subjecting said absorption oil to further distillation under a lower pressure in a second fractionating column to distill remaining absorbed constituents from said absorption oil, said further distillation being accomplished in the presence of dry gas from said absorption tower but in the absence of any constituents being recovered in the high pressure fractionating column and returning denuded absorption oil and vaporized fractions from said second fractionating column to said absorption tower.

4. A process as in claim 1 in which the vaporized fractions from said second fractionating column are cooled and compressed prior to returning them to the absorption tower.

5. A process as in claim 3 in which the uncondensed gases resulting from the condensation of the absorbed constituents vaporized from the high pressure fractionating column are also returned to the absorption tower.

EDWARD G. RAGATZ.